United States Patent [19]

Moss

[11] Patent Number: 5,485,962
[45] Date of Patent: Jan. 23, 1996

[54] PNEUMATIC APPLICATOR FOR AGRICULTURAL PARTICULATES

[75] Inventor: Robert W. Moss, Salina, Kans.

[73] Assignee: Moss Sales & Service, Salina, Kans.

[21] Appl. No.: 285,995

[22] Filed: Aug. 4, 1994

Related U.S. Application Data

[63] Continuation-in-part of Ser. No. 986,426, Dec. 4, 1992, abandoned.

[51] Int. Cl.$^6$ ................................................. A01C 15/04
[52] U.S. Cl. ........................................... 239/655; 239/662
[58] Field of Search ................................ 239/651, 654, 239/655, 662–664, 672–676, 77, 78; 251/205, 326

[56] References Cited

U.S. PATENT DOCUMENTS

| | | | |
|---|---|---|---|
| 907,851 | 12/1908 | Munson | 251/205 |
| 2,925,222 | 2/1960 | Spreng | 239/78 |
| 2,007,036 | 7/1935 | Cornell, Jr. | 251/326 |
| 3,704,553 | 12/1972 | Hehr et al. | 239/586 |
| 4,214,608 | 7/1980 | Mailliet et al. | 251/326 |
| 4,234,109 | 11/1980 | Goodhart | 239/663 |
| 4,562,968 | 1/1986 | Widmer et al. | 239/655 |
| 4,569,486 | 2/1986 | Balmer | 239/655 |
| 4,744,520 | 5/1988 | Widmer | 239/654 |
| 4,793,742 | 12/1988 | Strand | 239/655 |
| 4,852,809 | 8/1989 | Davis et al. | 239/654 |
| 4,949,906 | 8/1990 | Godwin | 239/654 |
| 5,052,627 | 10/1991 | Balmer | 239/655 |
| 5,178,333 | 1/1993 | Barber et al. | 239/655 |
| 5,267,696 | 12/1993 | Balmer | 239/662 |

FOREIGN PATENT DOCUMENTS

| | | | |
|---|---|---|---|
| 46968 | 2/1933 | Denmark | 239/655 |
| 368022 | 5/1990 | European Pat. Off. | 239/655 |
| 2553624 | 4/1985 | France | 239/78 |
| 407170 | 3/1934 | United Kingdom | 239/655 |

*Primary Examiner*—Karen B. Merritt
*Attorney, Agent, or Firm*—Kokjer, Kircher, Bowman & Johnson

[57] ABSTRACT

A device for the distribution of liquid or dry particulate material, particularly for agricultural use. The device is adapted to be mounted upon a truck chassis or other device for movement in a direction of travel. The device includes a single hopper which may alternatively receive the liquid or particulate material. A dry feed mechanism is provided to remove the material from the tank to a metering station where the particulate material is subdivided. A plenum chamber is also provided to entrain each subdivision of particulate material for pneumatic conveyance within a distribution tube extending laterally of the direction of travel. The plenum chamber is aerodynamically curved such that the air velocity is substantially lateral upon entering the distribution tubes, increasing the air velocity in the tubes. The distribution tubes have exits which are laterally spaced to provide an even distribution of the particulate material.

14 Claims, 5 Drawing Sheets

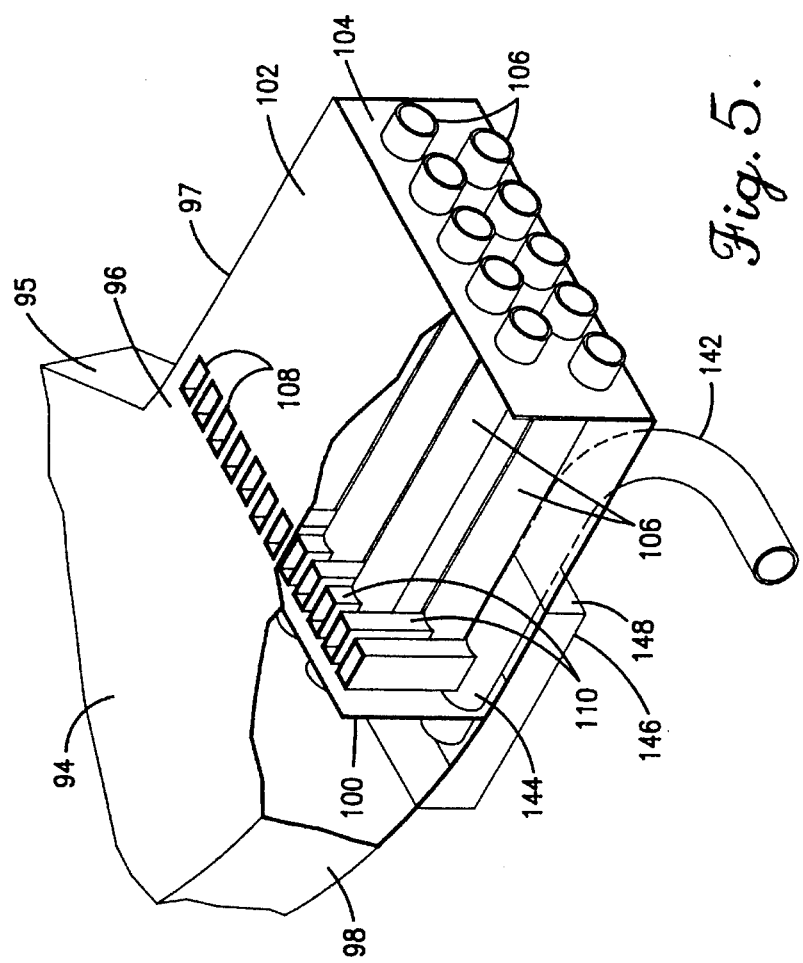
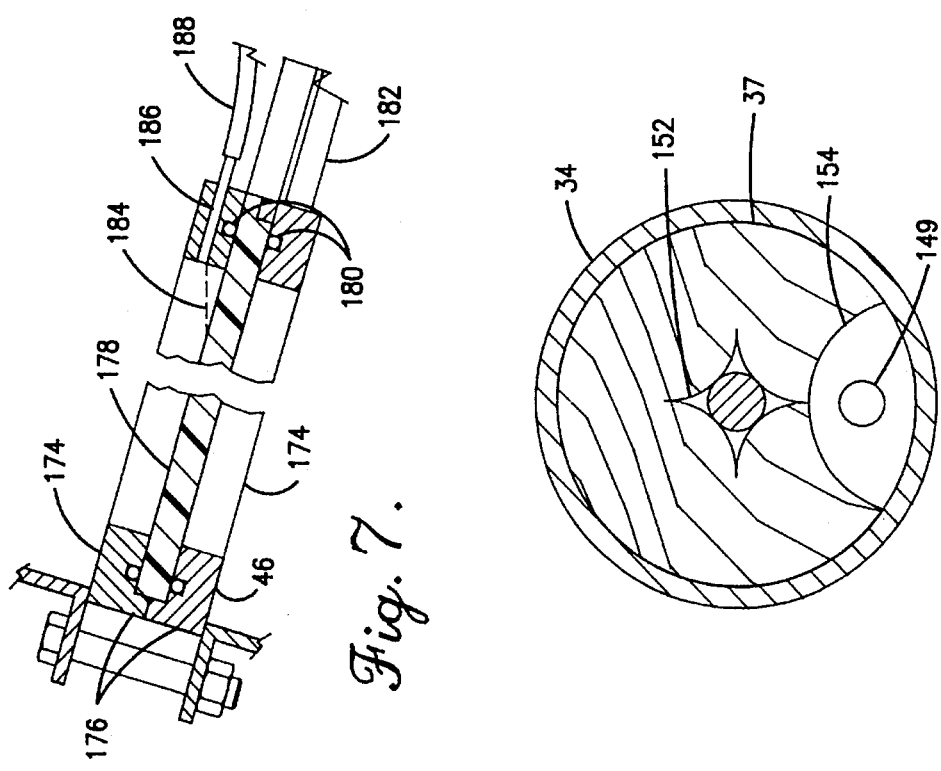

PNEUMATIC APPLICATOR FOR AGRICULTURAL PARTICULATES

CROSS REFERENCE TO RELATED APPLICATIONS

This application is a continuation-in-part of Ser. No. 07/986,426, filed Dec. 04, 1992, now abandoned, which is included herein by reference.

BACKGROUND OF THE INVENTION

1. Field of the Invention

The present invention relates in general to devices for applying dry particulate material. In particular, the present invention relates to an improved device for pneumatic application of dry particulates for agricultural purposes.

2. Description of the Related Art

It has been known for many years to distribute liquid material, especially liquid chemicals or fertilizer for agricultural use by the use of a powered vehicle. The vehicle will carry a large tank adapted to hold a quantity of the liquid. A pump is connected to the tank such that the liquid may be drawn from the tank and pressurized by the pump. The output of the pump is directed through lines to a plurality of nozzle units which ultimately distribute the liquid. To increase the area upon which the liquid is distributed, it has been known to provide booms which extend laterally from the vehicle, and to mount the nozzle units at laterally spaced positions along the booms.

In recent years it has been known to distribute dry particulate material in a similar manner. In particular, it has been known to provide a vehicle having a large storage tank or hopper adapted to receive a quantity of the dry particulate material. A feeding and metering means is associated with the hopper draws the material from the hopper and introduces it into a plenum chamber where the material is entrained within a fluid air stream. The entrained fluid is directed into a plurality of discharge pipes which extend laterally of the vehicle. The discharge pipes have lengths which are staggered in the lateral direction, such that the particulate material exits from the distribution pipes at similar spaced locations to increase the area of distribution. Exemplary pneumatic distribution systems are shown in U.S. Pat. No. 4,793,742 to Strand and U.S. Pat. No. 5,052,627 to Balmer.

While each of these arrangements has proved serviceable, the purchase price of such units is quite high. As may be envisioned, a chemical/fertilizer distributor who wishes to provide his customers with the choice of liquid or dry particulate materials must purchase both types of distribution equipment. Additionally, where both liquid and dry particulate materials are to be distributed within a short period of time, the distributor must send out both a liquid distribution unit and particulate distribution unit, with a driver for each unit, and possibly a supply or nurse truck for each unit. This greatly increases the labor costs associated with distribution of chemicals or fertilizers.

To overcome these drawbacks, it has been known to provide a distribution vehicle which includes a tank for holding liquid material and a separate hopper for holding dry particulate material. The remainder of the distribution systems are similar to those described above, with the pneumatic distribution pipes extending laterally of the vehicle and the nozzle units being located at laterally spaced positions along the distribution pipes.

SUMMARY OF THE INVENTION

An object of the present invention is to provide a device for the distribution of dry particulate matter which will provide an even distribution of such material.

Another object of the present invention is to provide a device for distribution of dry particulate material by pneumatic conveyance, having improved aerodynamic properties such that a greater amount of the material may be entrained and thus distributed.

A further object of the present invention is to provide a pneumatic distribution device in which the direction of the airflow is generally parallel to the distribution direction at the point that the material is entrained.

Yet another object of the present invention is to provide a device for the alternative distribution of liquid or dry particulate material.

Another object of the present invention is to provide such a device which employs a single tank or hopper to hold either the liquid or dry particulate material.

Yet another object of the present invention is to provide such a device with cleansing means to allow the tank or hopper to be cleaned and thus eliminate or reduce cross contamination between the liquid and dry particulate material.

These and other objects are achieved by a device for the distribution of liquid or dry particulate material, particularly for agricultural use. The device is adapted to be mounted upon a truck chassis or other device for movement in a direction of travel. The device includes a single hopper which may alternatively receive the liquid or particulate material. A dry feed mechanism is provided to remove the material from the tank to a metering station where the particulate material is subdivided. A plenum chamber is also provided to entrain each subdivision of particulate material for pneumatic conveyance within a distribution tube extending laterally of the direction of travel. The plenum chamber includes a Y section with aerodynamically curved walls to provide a lateral velocity to the airflow. The distribution tubes have exits which are laterally spaced to provide an even distribution of the particulate material. The device also includes a liquid pumping device for moving the liquid from the main tank to a plurality of nozzle units laterally spaced and mounted adjacent or on the distribution tubes. A valve arrangement is provided in the particulate material feed arrangement to prevent the liquid material from entering the particulate material metering device. A cleansing arrangement providing pressurized water is also included, such that the interior of the hopper may be washed to reduce cross contamination between the liquid and particulate material. A source of compressed air may also be provided to more quickly dry the interior of the hopper to reduce change over time.

BRIEF DESCRIPTION OF THE DRAWINGS

The objects and features of the invention noted above are explained in more detail with reference to the drawings, in which like reference numerals denote like elements, and in which:

FIG. 5 is a perspective view in partial cross section of the plenum arrangement of FIG. 3;

FIG. 6 is a cross sectional view along line 6—6 of FIG. 2;

FIG. 7 is a detailed cross sectional view showing a first embodiment of a main valve arrangement according to the present invention;

FIG. 8 is a detailed cross sectional view showing a second embodiment of a main valve arrangement according to the present invention; and FIG. 9 illustrates an insert used within the present invention.

DETAILED DESCRIPTION OF THE INVENTION

Figure 1:
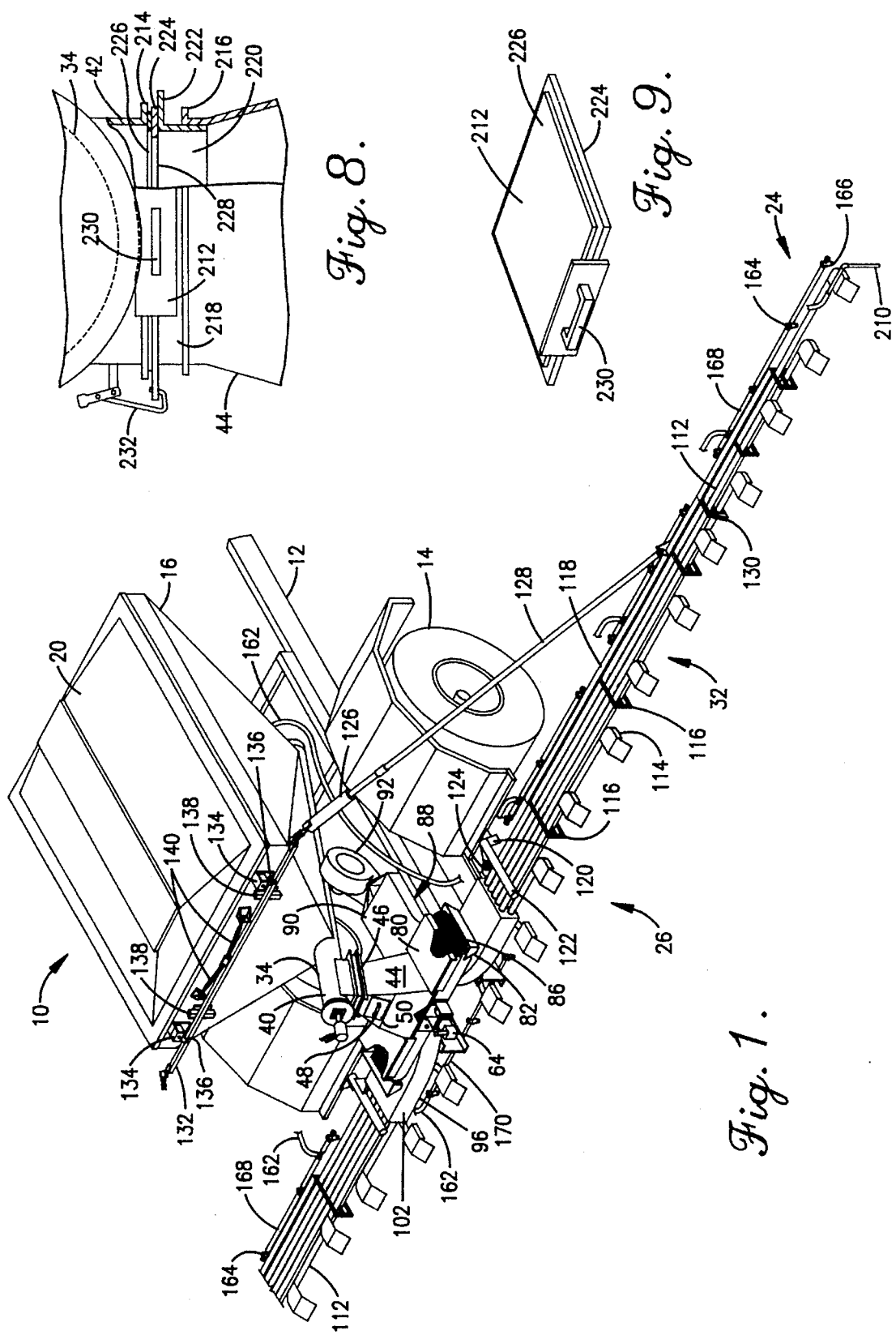
FIG. 1 is a detailed perspective view showing a device according to the present invention.

With reference to FIG. 1, a device according to the present invention is generally designated by reference numeral 10. The device 10 is mounted upon a support frame 12. The device 10 is intended to move in a direction of travel (hereinafter the longitudinal direction), and to this end the support frame 12 consists of a chassis of a truck or tractor, a chassis of a trailer to be pulled by a truck or tractor, or a frame which may be readily mounted upon such a truck, tractor, or trailer. Regardless of the particular arrangement, the device 10 will include, or be associated with, means permitting movement of the device with respect to the ground, typically including wheels 14.

Figure 2:
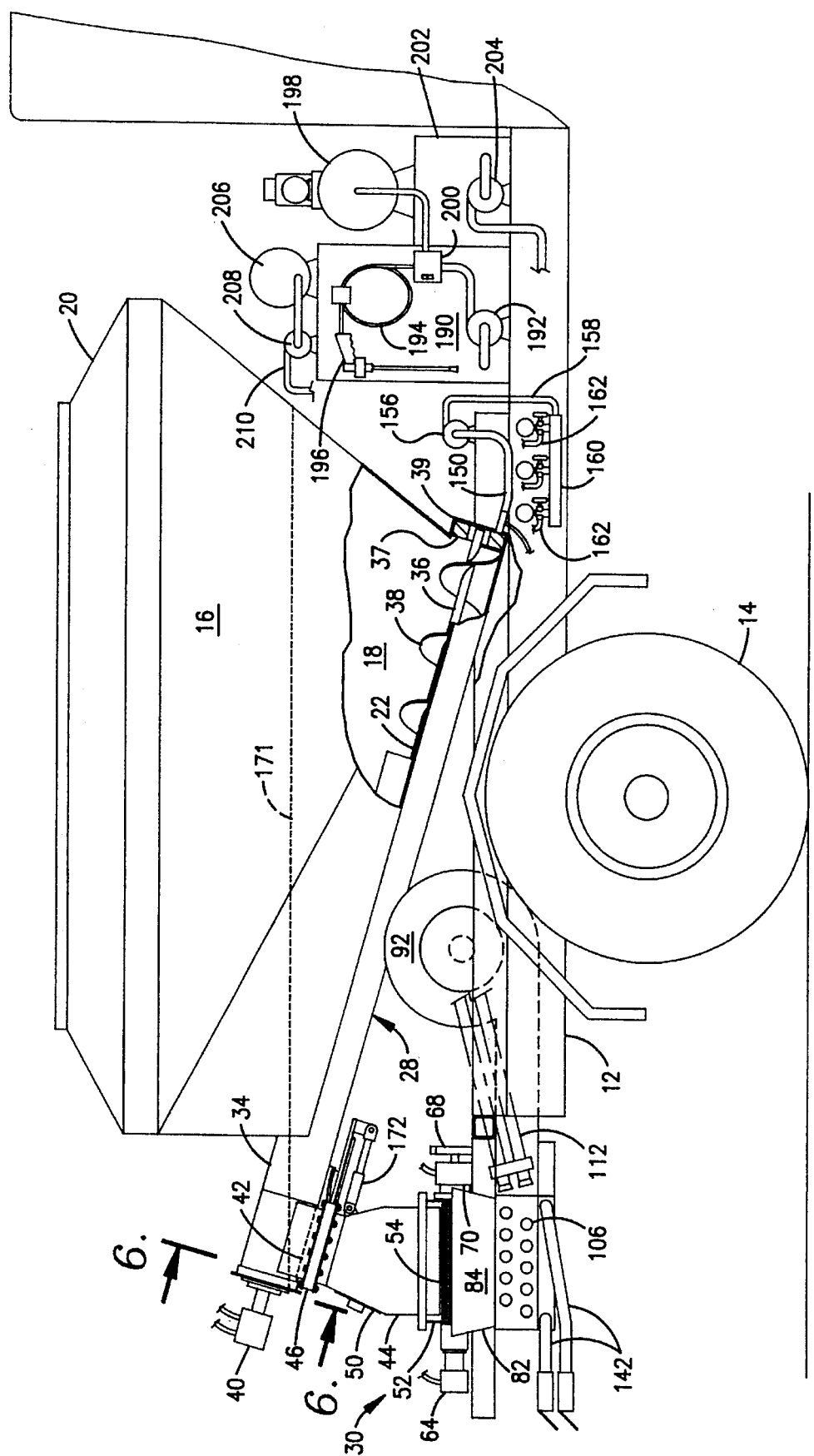
FIG. 2 is a detail side view in partial cross section of the device of FIG. 1.

The device 10 includes a hopper 16 having a plurality of upwardly extending sidewalls which define an interior cavity 18 (FIG. 2). The interior cavity 18 is intended to receive either liquids or dry particulate materials. To this end, the hopper is preferably formed of a stainless steel, to prevent corrosion with the liquid materials, and additionally preferably includes the sidewalls being arranged with a slanted or angled configuration to guide the materials to a particular location due to the influence of gravity. As the hopper 16 is intended to contain a relatively large mass of the liquid or dry material, it may include appropriate internal reinforcement (not shown) and will include appropriate support struts to fix it with respect to the support frame 12 (not shown for clarity).

The interior of the hopper may also include a plurality of baffles (not shown) to reduce the flow of the liquid within the hopper, to thus increase stability. In particular, a main baffle may take the form of a vertical wall extending from the front to the rear of the hopper. A pair of secondary baffles may then take the form of vertical walls extending laterally across the hopper to thus divide the hopper into six areas. The walls forming the baffles will be spaced slightly from the hopper along at least a portion of their bottom edges, and will include one or more through holes to permit some flow of the liquid within the tank. However, large scale flow is reduced.

To prevent the materials from falling from the interior cavity 18, or to prevent contamination of the materials by dust or moisture, the hopper 16 is provided with a cover 20 at, and extending between, the upper edges of the sidewalls. As the hopper 16 is intended to allow liquid material to be contained therein, the cover 20 will preferably provide a liquid-tight seal about its edges. Additionally it is preferred that the cover 20 may be moved from the closed position of FIG. 1 to an open position allowing substantial access to the interior cavity 18 to assist in the introduction of the liquid or particulate material into the hopper. To meet these requirements it is preferred that the cover 20 be formed as a substantially rigid member having rollers permitting movement between the open and closed position, and which may be moved into a wedge lock to provide the liquid-tight seal, such as covers sold under the name ROLLING TARP.

Alternatively, the cover 20 may be removably fixed to the hopper, and only the central horizontal section of the cover will be typically movable. In particular, the central section may be mounted for sliding laterally between a closed position and an open position. The top of this section could be provided with racks, and mating gears could be mounted to the remainder of the cover. In this manner, a hand crank connected to the gears could cause their rotation to thus control the position of the central section, and thus access to the hopper.

As is best shown in FIG. 2, the lower portion of the interior cavity 18 includes a discharge opening 22 through which the liquid or dry material may pass. From this discharge opening the liquid and dry materials will take different paths through a liquid material distribution means generally designated by reference numeral 24 (FIG. 1), and a dry material distribution means generally designated as reference numeral 26 (FIG. 1). The dry material distribution means 26 will be discussed first.

The dry material distribution means 26 generally includes a feed means 28 in communication with the discharge opening 22 (FIG. 2), and a spreading means which preferably includes both a metering means 30 (FIG. 2) to subdivide the particulate material and a discharge means 32 (FIG. 1) to discharge each subdivision of the particulate material.

With further reference to FIG. 2, while the feed means 28 may take various forms, it is preferred that it take the form of an auger arrangement having a cylindrical sleeve 34 within which is received and elongated auger shaft 36, with one or more helical lands 38 extending about the auger shaft 36 and closely received within the sleeve 34. An appropriate auger drive motor 40, preferably hydraulic, is fixed to the auger shaft 36 to provide rotation of the shaft with respect to the sleeve 34. The drive motor 40 is preferably of a type allowing variable speed as well as reversible drive, both for reasons discussed more fully below. The opposite, or forward end of the shaft 36 is received within a bearing 37, described more fully below, adjacent a front end plate 39 which seals the forward end of the sleeve 34.

In a preferred arrangement the sleeve 34 will define a lower portion of the hopper 16, with the discharge opening 22 being formed by a removed section of the sleeve 34. In this manner the dry particulate material within hopper 16 may readily fall through the discharge opening 22 to be engaged by the helical land 38. As may be envisioned, rotation of the auger shaft 36, and thus land 38, in a first direction will cause the dry particulate material to move towards the rear (to the left in FIGS. 1 and 2) and thus be feed from the hopper.

For reasons made more apparent below, it is preferred that the sleeve 34 be angled upwards towards the rear of the device such that the rear of the sleeve is vertically higher than the front of the sleeve. Where the sleeve 34 forms a lower portion of the hopper 16 this may result in the sidewalls forming a low angle with respect to the horizontal, at least in portions of the hopper. This lower angle may not be sufficient to allow the particulate material to freely fall towards the bottom of the hopper under the force of gravity. Where this is the case the hopper may be provided with means to assist in movement of the particulate material, such as a plurality of downward directed air jets along the upper lip of the sidewalls of the hopper, intended to impact upon the material within the hopper and thus move it downwards towards the discharge opening 22, one or more vibrator units fixed to the sidewalls, or other means known in the art.

A lower portion of the rear end of sleeve 34 is removed to define an outlet opening 42. The particulate material carried rearward by the land 38 will thus fall from the sleeve 34 through the outlet opening 42. The outlet opening 42 opens into a transition section 44 in the form of a plurality of rigid sidewalls defining open top and bottom ends, such that the particulate material may fall freely through the transition section. The upper portion of the transition section, closely adjacent to the outlet opening 42, is provided with a main valve 46, described more fully below, which may selectively open or close the top of the transition section. As such, the dry material may freely fall through the transition section only when the main valve 46 is in an open condition.

As is best shown in FIG. 1, the transition section may be provided with a dump opening 48 in a rear wall thereof, which opening is normally closed by a dump plate 50 removably fixed to the transition section 44. When the dump plate 50 is fixed in position, it will serve to act as a portion of the rear sidewall of the transition section, such that the particulate material may fall normally through the transition section. However, when the dump plate 50 has been removed, a hopper chute may be inserted therein. At this point all further particulate material falling into the transition section will fall upon the chute and exit through the dump opening 48, allowing the particulate material within the hopper to be quickly off-loaded or dumped without normal distribution. The vertical extent of this dump opening 48 is one reason for the vertical extent of the transition section 44 itself, and thus one reason for the vertical placement of the rear end of sleeve 34, as discussed above.

Alternatively, the front end plate 39 on the sleeve 34 could be removed and by reversing the auger the material may be off loaded. This arrangement will require a fixed bearing spaced from the sleeve 34 by one or more standoffs to maintain proper rotation of the shaft.

The transition section 44 opens at its lower end to the metering means 30. The metering means 30 includes front and rear laterally extending sidewalls 52 (FIG. 3) which support first and second endless belt conveyors 54. The conveyors 54 are arranged to direct the particulate material laterally of the direction of travel, and each has an interior end which is located below the transition section such that the particulate material will fall through the transition section onto the conveyors 54. Aside from their orientation, the belt conveyors 54 are substantially identical, and as such only one will be described. Each belt conveyor includes a drive shaft 56 (best shown in FIG. 4) which extends parallel to, and is spaced slightly laterally exterior of, the central longitudinal line of the transition section 44. The drive shaft 56 is journalled to the sidewalls 52 for rotation. In a similar manner, a driven shaft 58 is arranged parallel to the drive shaft 56, though spaced laterally exterior thereof. Each of the drive shaft 56 and driven shaft 58 will include a roller and/or one or more belt support gears 60 about which extends an endless belt 62. The support gears 60 are fixed to the driven shaft 58, but are freely journalled, as by bearings, to the drive shaft 56.

A conveyor drive motor 64 (FIGS. 1 and 4), preferably a variable speed hydraulic motor, is supported on the rearmost sidewall 52 and is operatively connected to one of the drive shafts 56, possibly through a gear reduction system 66. Each drive shaft 56 mounts a clutch 70 operatively connected to the belt support gears 60 mounted upon such drive shafts. As such, since the drive shafts are journalled with respect to the drive gears, the clutch 70 will allow the drive shaft to rotate with respect to the belt support gears, yet when the clutch is engaged the drive shaft and support gears will rotate as a single unit.

Each of the drive shafts 56 also includes a transmission gear 68 such that rotation of the one drive shaft 56 by the conveyor drive motor 64 will cause rotation of both drive shafts 56, in opposite directions, and at identical speeds. As may be envisioned, both drive shafts will thus rotate whenever the drive motor is operating, but the associated clutch 70 must be engaged to cause the support gears, and thus the belts, to rotate. The clutches 70 are preferably operable as independent units, such that one or the other, or both, of the belt conveyors 54 may be operated, thus providing greater versatility for the device 10.

As noted above, the belts 62 extend about the support gears 60, such that the belts 62 are rotated when the associated support gears 60 are rotated by the conveyor drive motor 64 via associated clutch 70. In this manner the particulate material falling upon the laterally interior end of each conveyor may be moved laterally outward upon the upper surface of the conveyor belt.

The belts 62 may be formed as actual belts having an appreciable width, and being formed of a rubber or synthetic material, but it is preferred that the belts 64 be formed as flexible metallic belts formed of numerous interconnected links. The use of such metallic chain belts will allow the particulate material to lodge at least partially between the links of the chain belts, thus ensuring a positive conveyance of the material. However, where the particulate material may conceivably fall through such links, the conveyors 54 are each provided with an upper support tray 72 and a lower support tray 74. The support trays will be located slightly spaced below the upper and lower runs of the endless belts 62 and will serve to prevent the particulate material from falling completely through the chain material of the belt.

Figure 3:
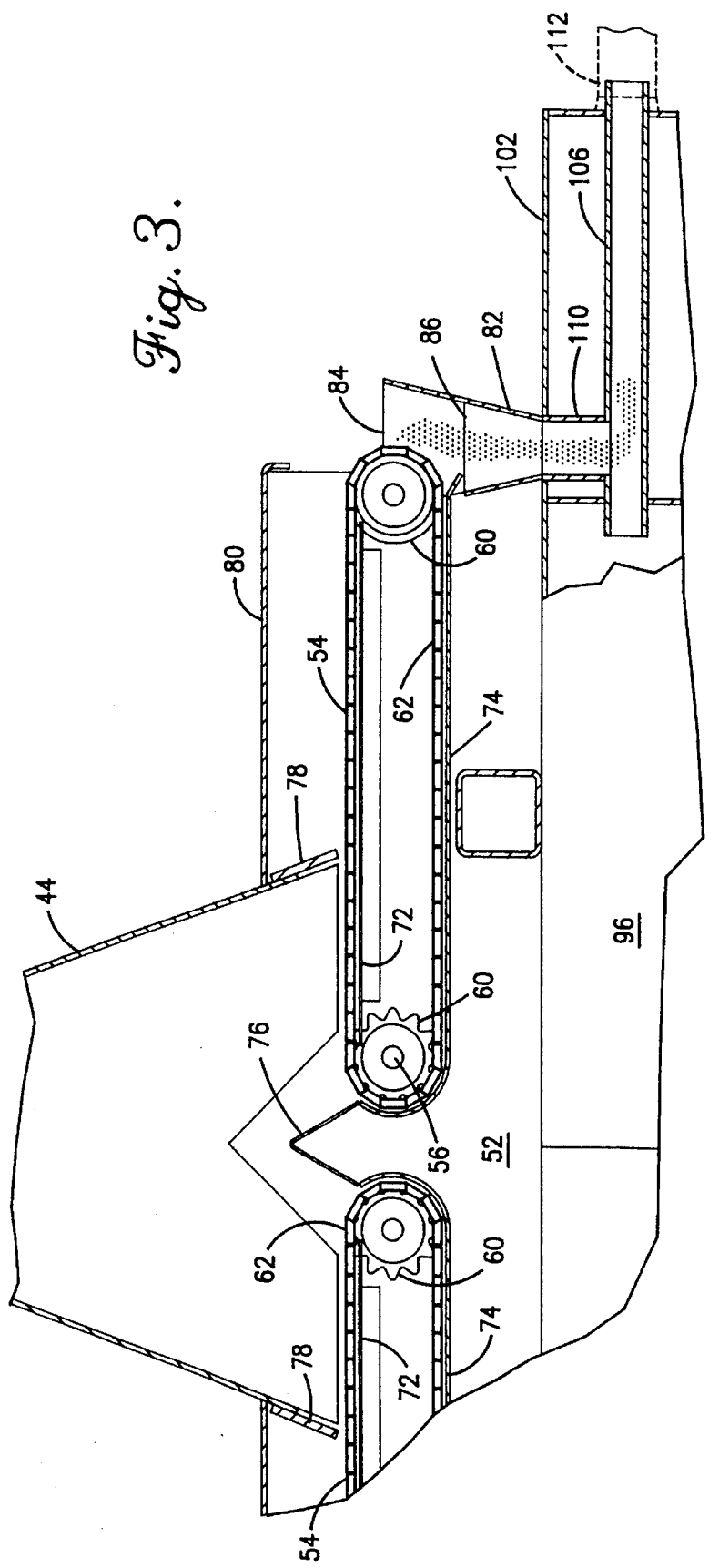
FIG. 3 is a detail elevation view in cross section showing a metering and plenum arrangement.

As is shown in FIG. 3, it is preferred that the lower support trays 74 be formed at their laterally interior ends with a radius corresponding to the curvature of the endless chain belt about the support gear 60 on the drive shaft 56. This arrangement is provided to prevent any unwanted buildup of particulate material between the conveyor belts. In particular, where a chain belt is employed, the particulate material may become lodged between the links thereof, such that a small portion of the material will not fall from the conveyor belt, but will be drawn back laterally inward along the lower run of the endless belt. The presence of the lower support tray 74 will serve to prevent the material from falling downward to accumulate, while the continued movement of the belt will draw the material laterally inward. This will continue about the curved interior section of the lower support tray, with this curved portion extending a sufficient distance such that the particulate material will again be retained between the links of the endless belt due to gravity during continued rotation of the belt. As such, there will be no buildup of particulate material falling from the interior curve of the belt of the belt, and all particulate material lodged between the links of the endless chain belt will be drawn back around and laterally outward to have another opportunity to fall from the endless chain belt.

As may be envisioned, each of the upper and lower support trays extend fully between the sidewalls 52 of the metering means, such that there is no undesired accumulation of the particulate material below at least the lower support tray 74. To further reduce this possibility, there is provided a divider plate 76 which extends between the laterally innermost free ends of the lower support trays 74. While the divider plate 76 could be a substantially horizontal member, it is preferred that it be in the form of an apex angling downward towards the lateral sides of the device. With this arrangement the material falling through the transition section will impact upon the divider plate 76 and undergo a first subdivision as one-half of the material falls upon one of the belt conveyors 54, while the other half of the material falls upon the other belt conveyor 54.

Before continuing with the description of the device 10, it is believed important to reiterate the advantages of the described arrangement over prior art dry particulate material distributors. First, there is the provision of the dump opening 48 and dump plate 50. This arrangement may be employed on any dry particulate material distributor, and allows for the quick and easy off loading of large amounts of the material from the hopper. Additionally, it is especially advantageous with the present device, as it may be necessary to remove the dry particulate material from the hopper in order to switch the device for use with liquids. A second advantage is the use of the curved radius portions of the lower support trays to eliminate material build-up, which may also find advantageous use on prior art devices. Finally, a third advantage is the direct connection between the transmission gears of the drive shafts. This positive driving arrangement assures that both conveyor belts operate at the same speed, and thus provide the same output. This increases the uniformity of the distribution of material, and could again be used to advantage on prior art devices.

Continuing with the description of the device 10, the lateral sides of transition 44 are each provided with a spreader plate 78 (FIG. 3) at the lower ends thereof, with the spreader plates extending in the longitudinal direction. The spreader plates are spaced slightly above the upper surface of the upper run of endless belt 62, and will serve to level the particulate material as it passes beneath the spreader plate during its travel laterally outward upon the belts 62, providing a uniform layer of the particulate material upon the belt. The plates are preferably mounted for adjustment to allow the depth of the particulate material layer to be varied. To ensure that this uniform layer is not unduly disturbed by wind, and to help prevent contamination by dust and moisture, the sidewalls 52 may be provided with belt cover plates 80 which extend between the sidewalls 52 of the metering means above the endless belts 62 laterally exterior of the transition section 44. The belt cover plates 80 preferably extend substantially to the lateral exterior ends of the belts 62 and may extend further beyond for increased protection.

To subdivide the layer of particulate material on the belts 62, there is provided a divider trough 82 below the laterally exterior end of each endless belt 62. As is best shown in FIGS. 1–4, each divider trough 82 includes substantially rectangular exterior sidewalls 84, with the laterally interior sidewall 84 in proximity to the lower support tray 74 to act as a continuation thereof. The sidewalls thus surround the laterally exterior end of the associated belt 62, such that the particulate material falling from the belt will pass within the sidewalls 84. Within the sidewalls 84, there are mounted a plurality of divider plates 86 extending between the laterally interior and exterior sidewalls 84. The divider plates 86 serve to subdivide the particulate material falling from the belts, such that each subdivision of particulate material will be surrounded by at least two sidewalls and one divider plate as it passes through the divider trough 82.

Figure 4:
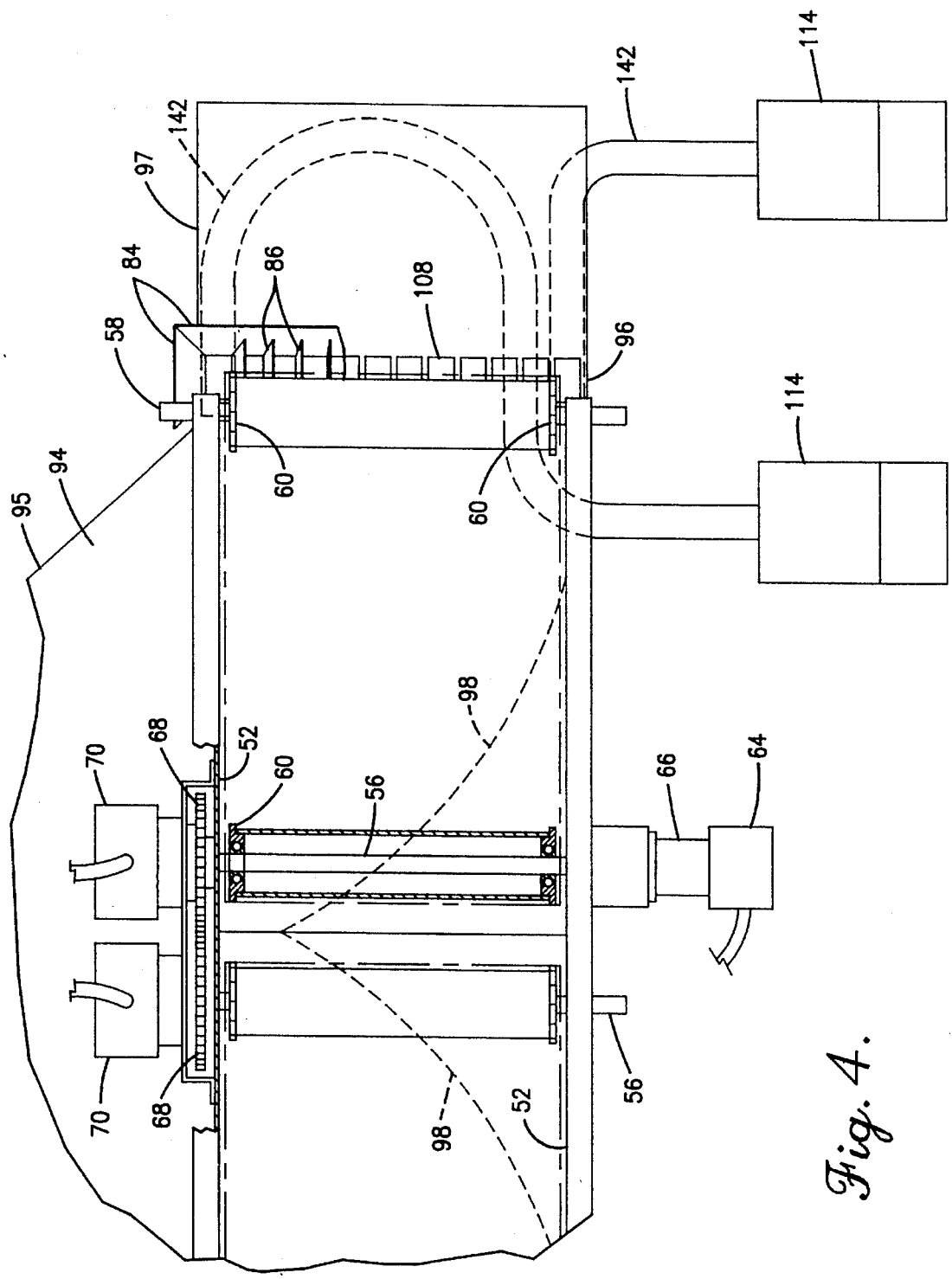
FIG. 4 is a detailed top view of the metering and plenum arrangement of FIG. 3.

The divider troughs 82, and the metering means 30, are mounted upon a portion of the discharge means 32. In particular, they are mounted upon a blower/plenum chamber 88. As is best shown in FIG. 1, the chamber 88 includes a substantially rectangular forward section 90 having its forward end in communication with a source of fluid pressure, such as air blower 92. As is best shown by comparison of FIGS. 1, 4, and 5, the forward section 90 of chamber 88 leads into a laterally widened transition chamber 94, which in turn leads at its rear end to a "Y" split into two laterally directed end sections 96. As shown in FIG. 4, the side wall 95 of the transition chamber 94 forms an obtuse angle with the side wall 97 of the end section 96. As may be envisioned, air expelled from blower 92 will pass through the forward section along a longitudinal path and through the transition chamber and thereafter be directed along a lateral path outward into the end sections 96. While the rear end of the end sections may be a substantially planar vertical wall extending in the lateral direction (i.e. a "T"), it is preferred that the end sections include a flow directing wall section 98 (FIGS. 4 and 5) in the form of an arc extending between a lateral mid-point of the transition section to the rear edge of the end sections. As may be envisioned, these arcuate wall sections 98 will serve to direct the air passing through the blower/plenum chamber aerodynamically into the end sections 96 with a greater lateral velocity component than would a typical flat end wall. Additionally, air deflector vanes (not shown) may be located within the chamber to further assist in the redirection of airflow.

With reference to FIG. 5, each end section 96 terminates in a substantially vertical, longitudinally extending barrier wall 100. Mounted laterally exterior of each barrier wall 100 is a plenum housing 102 having a laterally exterior end wall 104 which is substantially parallel to barrier wall 100. Extending between, and through each of the barrier wall 100 and end wall 104 are a plurality of plenum tubes 106. The plenum tubes are hollow or open, such that the air passing from the blower 92 through the blower/plenum chamber 88 may exit through the tubes 106.

The plenum tubes 106 are arranged in upper and lower substantially horizontal rows, with each row staggered such that each plenum tube 106 may be accessed vertically from above. The number and arrangement of plenum tubes could of course vary, so long as this vertical access is maintained. The upper face of the plenum housing 102 includes a series of draw holes 108, and a plurality of draw tubes 110 extend vertically downward from the draw holes to be connected with, and open into, an associated one of the plenum tubes 106 (FIG. 3).

Each of the draw holes 108 will be located below a divider trough 82, and surrounded by at least one of the divider plates 86 and at least two of the exterior sidewalls 84, such that the particulate material falling through and divided by, the divider trough will be passed through the draw holes and tubes, with each subdivided portion having an associated draw hole and draw tube. As is best shown in FIG. 3, the air from blower 92 will pass through the plenum tubes 106, such that the particulate material falling through the draw tubes 110 and into the plenum tubes 106 will be entrained within an air stream. Additionally, the air passing through the plenum tubes 106 will create an area of reduced pressure within the draw tubes 110, such that the subdivided particulate material is positively drawn into the plenum tubes 106. This reduced pressure area is a reason for the spacing of the belt cover plates 80 from the divider troughs 82, to allow atmospheric air to enter at this point.

As is best shown in FIG. 5, the laterally outer ends of the plenum tubes 106 extend a short distance outward of the end plate 104. As noted above, the entrained particulate material will pass through the plenum tubes 106, and to provide an even distribution of the particulate material there are provided a plurality of distribution tubes 112 (FIG. 1) through which the entrained material will pass. As is best shown in FIG. 3, the distribution tubes have laterally interior ends which mate with the laterally exterior ends of the plenum tubes 106. This mating configuration may be by the distribution tubes having a larger internal diameter than the external diameter of the plenum tubes, or by forming the distribution tubes with flared ends to fit over the plenum tubes.

The distribution tubes each have a different length, such that the free ends of the distribution tubes are laterally spaced. In this manner the particulate material exiting from each distribution tube will fall upon the ground in an area different from that of the material from other distribution tubes. As the entrained particulate material may exit from each distribution tube with substantial velocity, it is preferred that the free end of each distribution tube be fitted with a guide shield 114 which will alter the velocity of the air stream to a rearward and downward vector.

Each set of distribution tubes 112 is maintained in its array configuration by fixing, as by welding, to laterally spaced frame elements 116. Due to the substantial length of the distribution tubes, it is additionally preferred that the frame elements 116 themselves be joined together, as by a laterally extending angle member 118.

Each set of distribution tubes 112 is mounted to the support frame 12 adjacent its laterally interior end. Due to the length of the distribution tubes, it is preferred, as is known in the art, that the distribution tubes be mounted for pivotal movement between an operative and inoperative position. To this end, the support frame 12 mounts a first pivot 120 which is located in a substantially vertical plane with the pivot axis canted laterally outward at its lower end. Pivot 120 mounts a secondary pivot 122, with the secondary pivot cylinders having a substantially horizontal and longitudinal pivot axis when in the operative position shown in FIG. 1. Additionally, there is mounted an hydraulic cylinder 124 which extends between the support frame 12 and a bracket fixed to the second pivot cylinder 122. The array of distribution tubes is fixed to this secondary pivot cylinder 122.

As may be envisioned, the array of distribution tubes may be moved from the operative position of FIG. 1 about the axis of first pivot cylinder 120 by activation of the hydraulic cylinder 124. This will serve to rotate the laterally outer end of the distribution tubes forward and upward due to the orientation of the cylinder 120. Such rotation may continue until the distribution tubes are in the inoperative position, extending in a substantially longitudinal direction along the sides of the device, as illustrated in FIG. 2.

To provide additional support against undue flexing of the distribution tubes, and to assist in the storage of the tubes in the inoperative position, there is provided a strut assembly for each set of distribution tubes. As is best shown in FIG. 1, an hydraulic cylinder 126 is pivotally mounted to the hopper 16, and has its piston fixed to an elongated strut 128 which is in turn pivotally connected to the angle member 118. As may be envisioned, contraction of hydraulic cylinder 126 will cause the distribution tubes to pivot about the secondary cylinder 122. This arrangement, used in conjunction with the cylinder 124 and pivot cylinder 120 will allow the free end of the distribution tubes to be pivoted upward and downward, especially when in the folded inoperative position. In particular, the hydraulic cylinder 126 may be contracted to rotate the ends of the distribution tubes upward about secondary cylinder 122, whereupon the hydraulic cylinder 124 is activated to pivot the free ends of the distribution tubes laterally inward to the inoperative position. Thereafter, the hydraulic cylinder 126 may be extended to lower the free ends of the distribution tubes, such as into a holding tray which will securely retain the distribution tubes during travel.

As is known in the art, even this folding to an inoperative position may result in the free ends of the longest of the distribution tubes extending upwardly a distance greater than is desired for travel on common roadways. It is preferred, as is known in the art, to divide the longest of the distribution tubes and retain them together by means of a hinge frame 130. The hinge frame will allow the sections of the divided distribution tubes to be joined operatively together when in the operative position, but will allow the laterally outer ends of the divided distribution tubes to be folded about the hinge axis of the hinge frame back upon themselves to reduce the overall length of the distribution tubes for travel.

While each of the cylinders 126 and struts 128 may be pivotally mounted to a bracket fixed to the hopper 16, it is preferred that the cylinders 126 be mounted to a self centering device such that flexure of the distribution tubes in the operative position may be accommodated. To this end, each of the hydraulic cylinders 126 are pivotally connected to sway rod 132 at the laterally exterior ends of rod 132. The sway rod extends substantially horizontally and laterally at the rear face of the hopper 16. To allow for movement of the sway rod with respect to the hopper, there are provided a pair of sway blocks 134 at laterally spaced positions on the rear of hopper 16. Each sway block includes a pair of sway links 136 having a first end pivoted to the associated sway block and a second end pivoted to the sway rod 132. This will allow the sway rod to undergo lateral movement with respect to the hopper 16. To avoid undue wear upon the hopper, there may be provided appropriate sway spacers 138 between the sway rod and the hopper, and appropriate damping springs 140 may be fixed between the hopper 16 and sway rod 132 to dampen the movement of the rod, and thus the distribution tubes.

With this arrangement the dry material may be removed from the hopper 16, entrained within an air flow and distributed from the ends of the distribution pipes into a uniform layer upon the surface of the ground. However, this uniform layer will extend only behind the free ends of the distribution tubes. In particular, the central section of the support frame, that area between the end walls 104, is not covered by the distribution tubes 112, and thus will not receive a layer of the particulate material. To provide a uniform coating in this area also there may be provided secondary distribution tubes 142. As is best shown by comparison of FIGS. 1, 4 and 5, and beginning with FIG. 5, there may be provided a pair of secondary plenum tubes 144 (only one of which is shown in FIG. 5) which pass through the barrier wall 100 in a manner similar to the plenum tubes 106. As the secondary distribution tubes 142 are intended to be located directly behind the support frame 12, it is preferred that they not extend laterally as far as the distribution tubes 112. To that end, the plenum housing 102 may be formed with a lower box portion 146 which is in communication with the interior of the plenum housing at its forward end (upstream of the barrier wall 100). The lower box portion 146 will have a lateral extent less than that of the plenum housing 102, such that it forms a secondary end wall 148 laterally inward of the end wall 104. In a manner similar to the other plenum tubes 106, the secondary plenum tubes 144 will include draw tubes 110 extending downward from associated draw holes 108, such that they may receive their subdivision of the particulate material.

The secondary plenum tubes 144 are rigidly fixed to the secondary distribution tubes 142, as there is no need for the secondary distribution tubes to fold upwards to an inoperative position. The tubes 142 are, however, of a special configuration to provide an even distribution of material across the width of the support frame 12. As is best shown in FIG. 4, the rear secondary distribution tube 142 initially extends laterally outward, but includes a quarter turn to the rear and is terminated by a guide shield 114 similar to those discussed above. The forward secondary distribution tube 142 initially extends laterally outward, but includes a half turn towards the rear in a first direction, and a quarter turn towards the rear in a second direction, such that it terminates at a guide shield 114 at a position laterally inward of the rear most secondary distribution tube. As is best shown in FIG. 1, this arrangement, when employed at both lateral ends of the chamber 88, results in a full distribution for the dry material across the entire width of the device.

With this arrangement it may be found that the forward tube 142 has such a length and curvature that the material drops from entrainment, resulting in poor distribution. To avoid this, the plenum tube 144 associated with this tube may include a 180 degree bend, to direct the air flow laterally inward, prior to encountering the draw tube and thus the material. The tube may then exit from the plenum housing in a laterally inward direction and thereafter include a rearward bend and terminate in a guide shield 114 at the proper position laterally inward of the other shield 114. This reduced length and curvature downstream of entrainment may maintain the material properly entrained, or at least provide superior results to the previously described arrangement.

The arrangement described above will effectively and reliably distribute dry particulate material from the hopper 16 to the ground from the various distribution tubes 112 and 142. As is well known in the art, the vehicle upon which the device is mounted will include an appropriate speed sensor (not shown), and there will be provided appropriate control means (not shown) connected to the auger drive motor 40 and conveyor drive motor 64, such that the speed of these motors will be controlled to provide an even distribution of the particulate material regardless of variations in speed of the vehicle.

The arrangement for distribution of liquid material using this same device 10 will now be described. With reference to FIGS. 2 and 6, it may be seen that the front end plate 39 of the sleeve 34 includes an opening 149 adjacent its lower end, and an outlet hose 150 is operatively connected to this opening. As such, when a liquid material is held within the hopper 16, it will pass through the discharge opening 22, as with a dry material, and through the opening into the outlet hose 150.

It is noted that the location of the opening for the outlet hose in the front plate 39 requires that the bearing 37 for the auger shaft allow passage of the liquid through the outlet. This could be affected by various measures. For example, the shaft 36 could pass through the front plate 39, with a liquid tight seal and bearing being located exterior of the front end plate. However, to avoid the risk of seal failure, it is preferred to provide a bearing block as shown in FIG. 6. In particular, the bearing block 37 takes the form of a wooden block having a four pointed star pattern shaft opening 152, formed by four arcuate sections located at its center, with the shaft 36 received within this opening for a sliding fit. This shape of the opening will reduce contact between the wooden block and the shaft, and thus reduce friction. The lower portion of the wooden block 37 has a cut away 154 which will correspond to the lower portion of the sleeve 34, and thus the front end plate 39. This cut away will permit free flow of the liquid through the opening 149 and into the outlet hose 150.

The remainder of the liquid distribution system is substantially similar to other arrangements in the prior art, and includes a liquid pump 156 which, as with the dry material distribution means, may be controlled as to the speed of the vehicle for proper volume control. With reference to FIGS. 1 and 2, the pump 156 is connected to the outlet hose 150 and to an output hose 158 which leads to a branch box 160 having at least three pressure regulated outlet lines 162. Each of the outlet lines will travel rearward and be associated with one of the sets of distribution tubes, or with the secondary distribution tubes.

In particular, each set of distribution tubes 112 will include a series of laterally spaced nozzle units 164, preferably having removable nozzle heads 166 as is known in the art, with several nozzle units 164 being connected together with flexible lines 168. This will define a plurality of sets, three being shown in FIG. 1, associated with each array of distribution tubes 112. Each set of the flexible lines 168 will be connected to an associated one of the outlet lines 162, such that the liquid passing through the pump 156 will travel through the output line 162, through the flexible line 168 and exit from the nozzle units 164. As may be envisioned, this will provide an even distribution of liquid material in a manner similar to that provided by the distribution tubes 112. Also in a manner similar to that above, the portion of the vehicle directly behind the support frame 12 must be provided with a liquid distribution means.

To this end there is provided a rigid line 170 (FIG. 1) having laterally spaced nozzle units 164 with nozzle heads 166 operatively connected thereto. The remaining one of the outlet lines 162 will be connected to the rigid line 170 to provide a flow of pressurized liquid to the rigid line 170 in a manner similar to that described above. The flexible line 168 and rigid line 170 may be mounted to the support frame 12 and distribution tubes 112, or frame elements 116 using standard brackets known in the art. It is also noted that rigid lines could be employed on the distribution tubes, or a flexible line employed behind the support frame 12.

While this arrangement is suitable for passing liquid from the hopper 16 to the nozzle units 164 for even distribution of liquid material, the dashed line 171 of FIG. 2 represents the level of liquid within the hopper, and illustrates that the liquid level will at times be above the outlet opening 42 at the rear end of the auger sleeve 34. Where the main valve 46 is in the open position as for use with a dry particulate material, this would allow the liquid material to pass through the transition zone to the conveyor elements, and outward onto the ground, which is highly undesirable. As such, when the hopper 16 is employed for the storage of liquid the main valve 46 is moved to the closed position by the use of an hydraulic cylinder 172 or other well known means. The main valve 46 may be any type of valve which may reliably seal against the passage of liquid, such as butterfly or flapper valves.

While various types of valves may be employed, in a first embodiment the main valve 46 may be formed as a slide valve, best shown in FIG. 7. In particular, the valve 46 includes a pair of open rectangular valve frame members 174 which are arranged in a substantially coaxial position, and which include a peripheral lip portion 176 extending about three of the four sides of the rectangular members. Seated between the frame members 174 is a rectangular valve plate 178. A peripheral groove is formed in the inner face of each valve frame member 174, and a seal member 180 is located within this groove such that it may contact the valve plate 178 and provide a liquid seal. The valve plate 178 may slide between the positions shown in FIG. 7 to an extended position shown in FIG. 2, outward from the one side of the rectangular frame members which does not include the peripheral lip portion 176.

As the valve plate 178 will have the majority of its length beyond the outer periphery of the frame members 174 when in the open position, the lower frame member 174 may include a plate support 182 upon which the valve plate may rest when in the open position. As may be envisioned, operation of the hydraulic cylinder 172 will move the valve plate between the open and closed position, providing a liquid seal during use of the device with liquid materials, or providing an opening for passage of dry particulate materials when such are used with the device.

When the liquid level 171 falls due to distribution of such liquid material, a pool or reservoir of the liquid material may be retained upon the closed valve plate 178, due to the angled orientation of the main valve, and its position vertically below the opening 42, as indicated by the dashed line 184 in FIG. 7. To remove the liquid material from this area to prevent contamination of other liquid materials or dry materials introduced in to the hopper 16 at a later time, the main valve is provided with a drain arrangement.

In particular, a drain passage 186 extends through the lowermost face of the upper frame member 174 and is connected to a drain line 188. The drain line 188 may pass along the length of the sleeve 34 and be connected to the outlet hose 150, such that a vacuum effect due to operation of pump will positively draw the liquid material from its position upon the valve plate 178. However, it is preferred that the drain line 188 simply be connected to the sleeve 34 at a position vertically below the drain passage 186, such that drainage will occur back into the interior of sleeve 34 without the possibility of air being introduced into the outlet hose 150.

A second embodiment of the valve 46 is shown in FIG. 8. In this embodiment, the valve takes the form of a replaceable insert 212. In particular, the outlet opening 42 from the auger ends in a flange 214, while the transition section 44 begins with a seat 216, with the seat and the flange being spaced from each other. Received within the seat 216 is a presser 218. The presser 218 includes a throat 220 received within the opening of the transition section, and a head flange 222 extending outward from the upper end of the throat 220. The throat is slightly smaller than the transition section, such that the presser is freely slidable in the vertical direction. As may be seen, the head flange prevents the presser from falling within the transition section.

The insert 212 is received between the flange 214 and the head flange 222. The insert includes a body 224, typically formed of a rigid material such as metal. Further, the insert includes a gasket 226 for engagement with the flange 214. Alternatively, the gasket may be mounted upon the flange 214. In either event, the presser may be lowered to permit placement and removal of the insert, and then raised to wedge the insert in place and form a seal. This permits the insert and presser to bridge the space between the outlet 42 and the transition section 44.

Two different inserts are provided. The first is shown in operative position in FIG. 8, and includes a through-hole 228 which permits the dry material to pass through the insert. The second insert is shown in FIG. 9 in the inoperative position and is a solid sheet. When this second insert is in position, the valve 46 is closed, and liquid may not pass. To assist in placing and removing the inserts, they may be provided with a front face with a handle 230. As such, when the presser is in its lowered position, the insert may simply be manually placed or removed by sliding it between the flanges 214 and 222.

Additionally, the presser is provided with means for releasably securing it in the upper position. To this end, the presser is provided with extensions on the flange 224, with each extension having a hole therethrough (not shown). A pair of lock brackets 232 (only one shown) are mounted on the outlet, each including a hook which may be inserted into the hole in the extension. Locking the bracket then holds the presser in its upper position. Unlocking allows the presser to fall to its lower position.

With the above arrangement it may be seen that a single hopper may be employed for either dry or liquid materials, with the operation of main valve 46 permitting such use. This is in contrast to prior art devices of which the inventor is aware, which employ two tanks, one for each type of material, or which have a single tank for a single type of material.

While the use of the main valve physically allows the device to operate with liquid or dry material using a single hopper, in actual use there may be cross contamination problems when switching from liquid to dry and vice-versa. For example, the liquid may leave a tacky residue within the hopper and auger arrangement which causes build-up of the particulate material, impeding proper flow. Another example is small quantities of particulate material remaining in the hopper and auger arrangement, which will be entrained within the liquid and cause blockage of the lines.

To overcome these problems, there may be provided a cleansing system. It has been known to provide dry particulate distributors for agricultural use with water tanks, associated pumps and hoses such that the water may be pumped from the tank into the hopper to wash the interior of the hopper. This is also provided on the present device, in the form of a water tank 190 mounted upon the support frame 12, with an associated pump 192. The pump 192 will pass the water into a hose line 194 having a length sufficient to reach most if not all of the device, including the interior of the hopper, and may include a nozzle/handle 196 at the end thereof.

To speed the turnover time after washing the device using the water tank, or an outside washing system, it is preferred that the present cleansing system also include a drying means. For example, there may be provided an air compressor/tank assembly 198 mounted upon the support frame, with an appropriate air hose and air chuck mounted on the end thereof. This would allow the user to direct blasts of compressed air into the hopper and other elements to blow droplets of water down or away, and increase the speed of evaporation. Alternatively, the air tank 198 may be connected to a valve switch 200, which also connects the water pump 192 to the hose line 194, such that the pump may be disconnected from the line 194 and the air tank connected thereto. This would allow the user to employ the single line 194 and associated nozzle as the air hose and chuck.

Further drying arrangements are also possible. For example, the upper edge of the interior of the hopper may include air outlets connected by appropriate air ducts to the blower 92, with an appropriate valve allowing connection of the blower to either the plenum chamber 88 or to the ducts to the hopper. With this arrangement, the cover 20 could be fully or partially closed and the air from blower 92 passed into the hopper for a period of time to dry the hopper. Various heating elements to heat the hopper or the air used to dry the hopper could also be employed to speed the drying process.

The ability to dry the hopper and other elements may greatly reduce the time required to change between products, increasing the utility of the present device. This is especially true since its ability to operate with either liquid or dry material may result in this being the only device employed by a particular user, and thus the only device available for distribution of material. Additionally, it will assist in increasing the operating time of the device, making the device more cost-effective.

Final elements of the device 10 are common in the art and include an hydraulic fluid tank 202 and associated pump 204 for supplying the pressurized hydraulic fluid used to operate the various motors and pumps. A tank 206, with associated pump 208 and lines 210 may be employed to direct marking foam to the laterally exterior portion of the distribution tubes. Other elements common to devices of this general class may of course be provided, but have been excluded from the drawings and description for clarity. For example, it is common to provide tail lights upon the vehicle, to provide a radiator for cooling the hydraulic fluid, etc.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. In a device for distributing particulate material, of the type having a hopper to store the material, means for feeding the material from the hopper, an air blower for outputting air along a longitudinal path and means for distributing the material along a lateral path, the improvement comprising:

chamber means for conveying air from the blower to the distribution means and for gradually and aerodynamically redirecting air from the longitudinal path of the blower to the lateral path of the distribution means, said chamber means including a forward section, having a first end located proximate the blower, and a transition chamber attached to an opposite end of said forward section, said transition chamber communicating with end sections attached to the distribution means.

2. In a device, according to claim 1 wherein said transition chamber includes side walls separated by a width which is laterally wider than a width between side walls of said forward section to gradually redirect the air between said longitudinal and lateral paths.

3. In a device, according to claim 1, wherein said opposite end of said forward section leads into a laterally widened transition chamber.

4. In a device, according to claim 1, wherein said transition chamber includes a Y-shaped rear end section.

5. In a device, according to claim 1, wherein said transition chamber includes laterally opposed side walls which join side walls of said end sections at obtuse angles.

6. In a device according to claim 1, wherein the feed means includes a sleeve for receiving material from a bottom of the hopper and an auger for delivering the material to the distribution means, said sleeve being mounted to angle upward toward a rear end of the hopper, a rear end of the sleeve being vertically higher than a front end thereof.

7. In a device according to claim 1, wherein the feed means includes an auger within a sleeve to deliver material to the distribution means, said sleeve including an outlet opening at one end thereof, and a transition section having an open top end located proximate said outlet opening to receive material therefrom and having an open bottom end to deliver the material to the distribution means.

8. In a device, according to claim 7, wherein said transition section includes a plurality of side walls defining said open top and bottom ends, and a main valve for selectively opening and closing said top end.

9. In a device, according to claim 1, wherein said improvement further comprises:

first and second conveyors having interior ends located below the feed means, said conveyors extending laterally outward and in opposite directions from one another.

10. In a device according to claim 1, further comprising first and second conveyors extending laterally, said conveyors having interior ends to receive material positioned rearward of said forward section of said chamber means and above said transition chamber, said conveyors including discharge ends opposite said interior ends, said discharge ends being positioned above said end sections of said chamber means.

11. In a device according to claim 1, further comprising a barrier wall terminating said end section of said chamber means and a plurality of hollow plenum tubes, each of which has one end extending through the barrier wall to receive air from said end section.

12. In a device according to claim 11, wherein said plenum tubes are arranged in upper and lower horizontal rows, with each row staggered to provide vertical access to each tube.

13. In a device according to claim 11, further comprising a plenum housing mounted laterally exterior of said barrier wall, wherein said plenum housing includes a plurality of vertically aligned draw tubes, upper ends of which include draw holes to accept material and lower ends of which connect with and deliver the material through sides of said plenum tubes at a point therealong downstream of said one end extending through said barrier wall.

14. In a device according to claim 1, wherein said forward section is aligned along said longitudinal path, said end sections are aligned along said lateral path, said forward section leading into said transition chamber which is split into first and second rear ends which lead into said end sections.

\* \* \* \* \*